Jan. 20, 1925.

R. ZIESING 1,523,990

FURNACE

Filed Oct. 20, 1922

2 Sheets-Sheet 2

INVENTOR.
Richard Ziesing
BY
Fay Oberlin & Fay
ATTORNEYS

Patented Jan. 20, 1925.

1,523,990

UNITED STATES PATENT OFFICE.

RICHARD ZIESING, OF CLEVELAND, OHIO.

FURNACE.

Application filed October 20, 1922. Serial No. 595,726.

*To all whom it may concern:*

Be it known that I, RICHARD ZIESING, a citizen of the United States, and a resident of Cleveland, county of Cuyahoga and State of Ohio, have invented a new and useful Improvement in Furnaces, of which the following is a specification, the principle of the invention being herein explained, and the best mode in which I have contemplated applying that principle so as to distinguish it from other inventions.

The present invention relates, as indicated, to furnaces and is particularly adapted for use in connection with zinc retort furnaces in which zinc ore is distilled, or zinc from the same is recovered as metal. The principal object of the invention is the provision of means for accurate regulation of the secondary air supply which controls the combustion, and therefore the temperature in the furnace. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
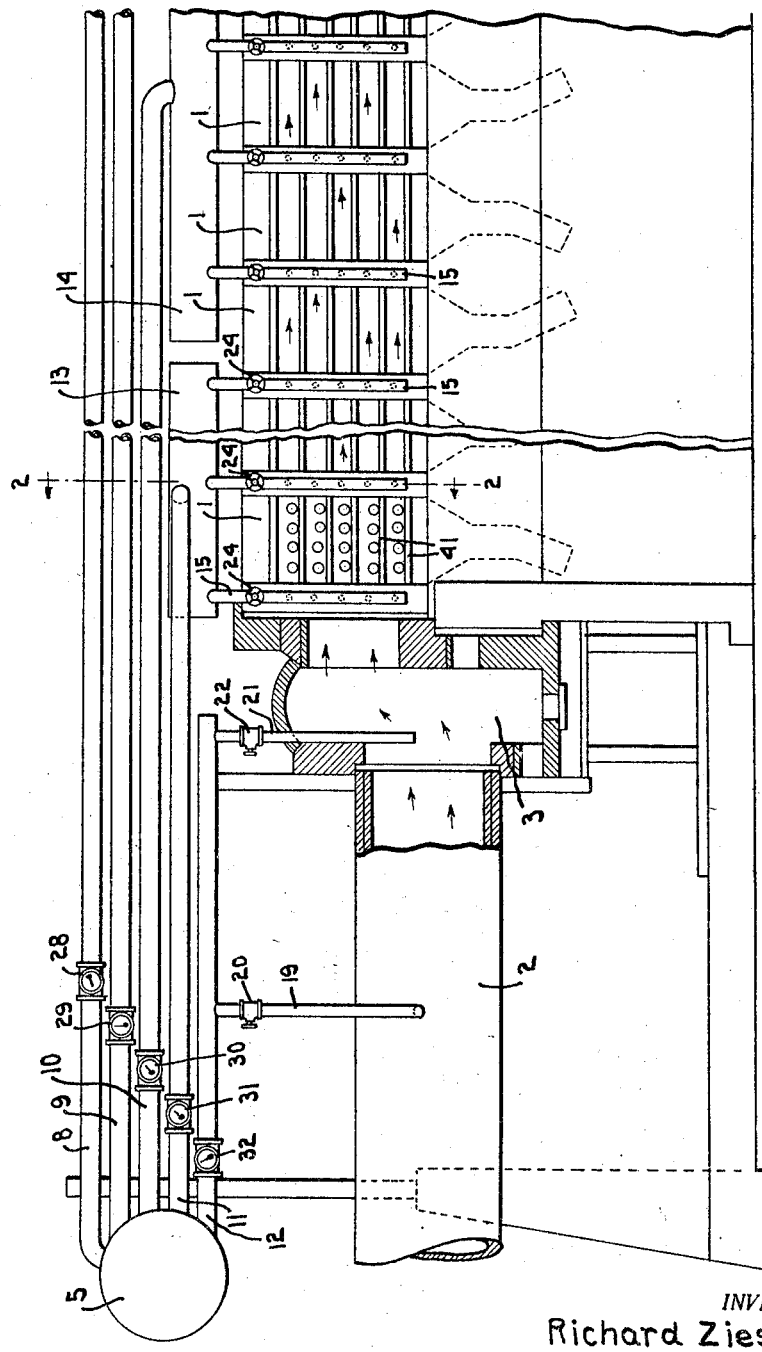
Figure 2:
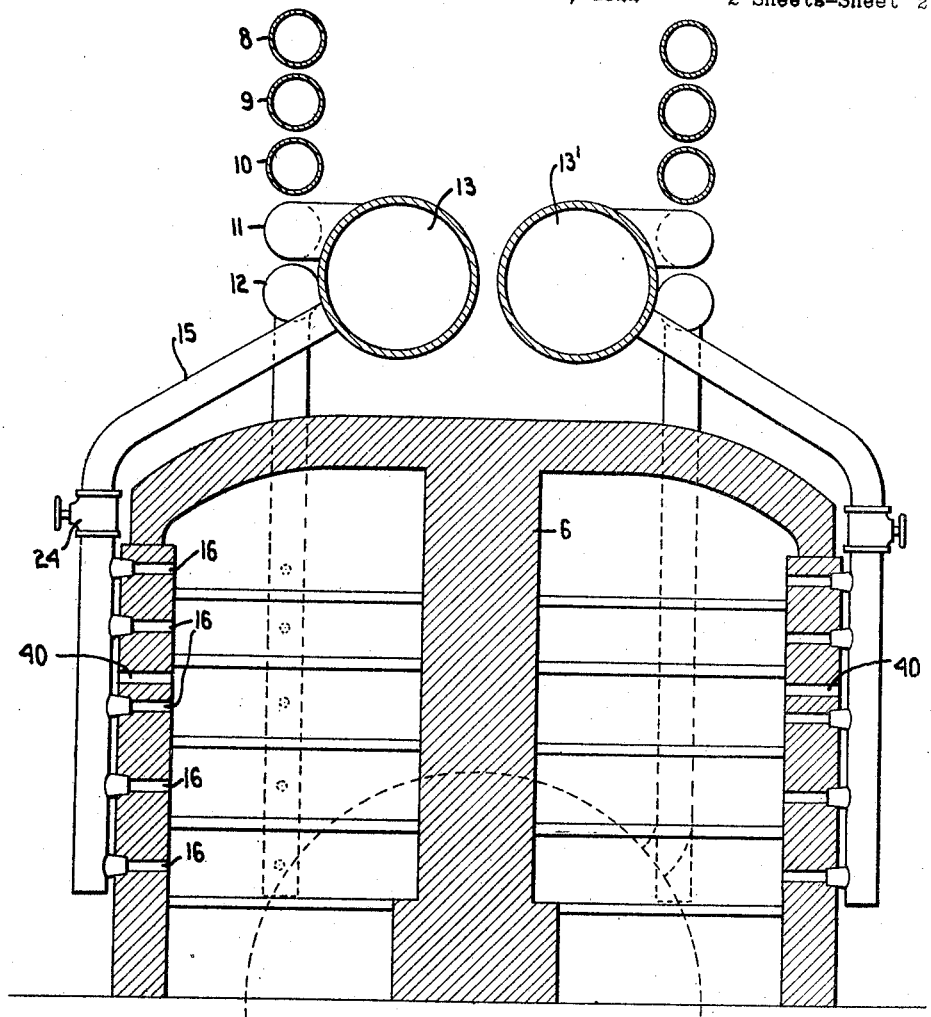

Fig. 1 is a longitudinal central view through my improved furnace; and Fig. 2 is a transverse section on the line 2—2, Fig. 1.

In Fig. 1 there is shown a series of furnace retort sections 1 which open into one another and form a continuous flue-like chamber, through which the fuel, in the form of gas, is passed. This gas is supplied from the gas producer and passes through a conduit 2, then into a chamber 3, and from this chamber into the first of the series of retort sections 1. After passing through all of the retort sections it is allowed to escape through a suitable stack. It is understood of course that the zinc ore to be treated is charged into the retorts 41 extending through the various furnace sections and carried on shelves at either end, the shelves supporting the rear or closed end of the retorts being built into the middle wall of the furnace, and the shelves carrying the forward or open end of the retorts being built into the front wall of the furnace sections.

Air is supplied to such a furnace through main supply conduit 5, which is connected to furnish air to entire series of furnace sections. The air flows from the main conduit 5 into a series of parallel conduits 8, 9, 10, 11 and 12, which extend along and above the series of retort sections, each conduit being connected to one of the headers 13, 14, etc. The air flows from these headers into downwardly extending conduits 15, and from these conduits through openings 16 in the walls of each of the sections, as indicated in Fig. 2. In addition to the air supply for the various conduits the lowermost conduit 12 supplies air for the preliminary combustion of the gas in the conduit 2 through a pipe 19, controlled by a valve 20, and also to the chamber 3 through a pipe 21, controlled by a valve 22. The various downwardly directed conduits 15 are all provided with valves 24 so that they may be closed when the section is not in operation, and these valves also serve in an emergency to equalize the air which is furnished to the sections when the entire series is in operation.

Ordinarily air is supplied to the sections of such a zinc furnace through a series of conduits somewhat similar to the ones described above, but the entire regulation of the air as it applies to individual sections must be had through a series of valves corresponding to the valves 24, that is, by means of valves which are inserted in the pipes at each section. It is a matter of considerable skill for an operator to watch the various sections and to properly control the numerous valves so that air is supplied to those sections which have sufficient gas to require it, but is not supplied to the further sections for which there may be an insufficient supply of gas.

In the present construction I provide a series of valves 28, 29, 30, 31 and 32, which are mounted in the conduits 8, 9, 10, 11 and 12, respectively, adjacent to the main supply conduit 5, and sufficiently close together so that a single operator can control the air supply of each of the headers 13, 14, etc., from a single point. In the operation of such a furnace, when the gas producer is first started there is usually only sufficient gas for operating a single bank of sections, and in this condition the operator would close the valves 28, 29 and 30, leaving the valves 31 and 32 open, so that the preliminary heating of the gas will be done in the conduit 2, chamber 3 and the first series of retorts receive only so much air from the header 13 as to take care of the gas delivered there, while the balance of the furnace having no gas will have its air supply entirely shut off. By observing the flame through the flame openings 40 in the front wall of the furnace sections the operator can determine the increasing flow of gas, and can then successively open the valves 31, 30, 29 and 28 to place the entire series of retort sections in operation, but without the waste, either of any gas or of any air, and without the necessity of attempting the individual adjustment of all of the valves 24. These latter valves are usually set to equalize the flow of air into the retort sections receiving air from any single header, and need not be adjusted during the operation of the furnace. One of the principal advantages of the present invention is a considerable economy in the fuel consumption of the furnace, which has been found to be from 10 to 20 per cent with very ordinary supervision, while to effect these economies with the old system involved the very nicest adjustment and the highest class of operators.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a furnace of the character described, the combination of a series of retort sections in communication with each other, a gaseous fuel supply conduit connected to the first of said sections through which fuel may be supplied to all said sections, a main air conduit, a series of air conduits leading from said first-named conduit along said sections and each of such conduits being connected to furnish air to a certain number of adjacent sections, and means located in said series of conduits adjacent said main conduit for individually controlling the flow of air through said conduits.

2. In a furnace of the character described, the combination of a series of aligned retort sections in communication with each other, a gaseous fuel supply conduit connected to the first of said retort sections for furnishing fuel to all said retort sections, a series of headers, each connected to several adjacent retort sections, a series of air conduits each connected to one of said headers for supplying air thereto, a main air conduit connected to said first-named air conduits, and valves mounted in said first-named air conduits adjacent each other, whereby the air supply to each of said headers may be individually controlled from a single point.

3. In a furnace of the character described, the combination of a gaseous fuel supply passage, a combustion chamber connected therewith, a series of communicating retort sections connected to said chamber, means for supplying air to said passage, said chamber and said retort sections, and other means adapted to control individually such air supply to said passage, chamber and retort sections, said means including valves positioned adjacent each other.

4. In a furnace of the character described, the combination of a gaseous fuel supply passage, a combustion chamber connected therewith, a series of communicating retort sections connected to said chamber, a series of headers mounted adjacent said retort sections, each header being connected to a certain number of retort sections, air conduits mounted adjacent each other, said conduits connecting respectively with said headers, said passage and said chamber, and valves in said conduits, said valves being mounted adjacent each other whereby the flow of air to said headers, said passage and said chamber, may be controlled from a single point.

Signed by me, this 29th day of September, 1922.

RICHARD ZIESING.